(12) United States Patent
Kiani et al.

(10) Patent No.: US 6,769,814 B2
(45) Date of Patent: Aug. 3, 2004

(54) WAFERIZED FIBER OPTIC CONNECTOR

(75) Inventors: Sepehr Kiani, Watertown, MA (US); Richard F. Roth, Brookline, NH (US)

(73) Assignee: Teradyne, Inc., Boston, MA (US)

( * ) Notice: Subject to any disclaimer, the term of this patent is extended or adjusted under 35 U.S.C. 154(b) by 172 days.

(21) Appl. No.: 10/196,075

(22) Filed: Jul. 16, 2002

(65) Prior Publication Data

US 2003/0044125 A1 Mar. 6, 2003

Related U.S. Application Data

(60) Provisional application No. 60/316,594, filed on Aug. 31, 2001.

(51) Int. Cl.[7] .................................................. G02B 6/36
(52) U.S. Cl. .......................................... 385/78; 385/60
(58) Field of Search ............................. 385/78, 88, 60, 385/85

(56) References Cited

U.S. PATENT DOCUMENTS

| | | | |
|---|---|---|---|
| 4,881,792 A | 11/1989 | Alameel et al. ........... | 350/96.2 |
| 5,080,461 A | 1/1992 | Pimpinella .................. | 385/65 |
| 5,121,454 A | 6/1992 | Iwano et al. ................. | 385/60 |
| 5,125,056 A | 6/1992 | Hughes et al. ............... | 385/59 |
| 5,134,679 A | 7/1992 | Robin et al. ................. | 385/90 |
| 5,245,683 A | 9/1993 | Belenkiy et al. ............. | 385/72 |
| 5,363,460 A | 11/1994 | Marazzi et al. .............. | 385/70 |
| 5,642,450 A | 6/1997 | Oda ............................ | 385/60 |
| 5,673,346 A * | 9/1997 | Iwano et al. ................. | 385/60 |
| 6,276,839 B1 | 8/2001 | De Marchi .................. | 385/53 |

FOREIGN PATENT DOCUMENTS

| | | | |
|---|---|---|---|
| EP | 0613030 | 8/1994 | G02B/6/38 |
| EP | 1180701 | 2/2002 | G02B/6/38 |
| GB | 2124793 | 2/1984 | |
| JP | 59140411 | 8/1984 | G01B/7/26 |

OTHER PUBLICATIONS

3M Interconnect Solutions, "Daughter Card and Backplane Couplings—OGI Series", Nov. 21, 2002.

Diamond SA, "Diamond: Fiber Optic Components".

* cited by examiner

Primary Examiner—Dean A. Reichard
Assistant Examiner—Jinhee Lee
(74) Attorney, Agent, or Firm—David H. Hwang; Teradyne Legal Dept.

(57) ABSTRACT

Generally, a fiber optic connector having at least one wafer, wherein the wafer holds at least one optical fiber, is provided. The wafer includes a retractable shroud, a body to receive the retractable shroud, and at least one biasing member. The biasing member is capable of being biased when the wafer contacts a corresponding mating wafer to cause the shroud to retract. In one specific detailed perspective and embodiment of the invention, the wafer as stated further includes the retractable shroud having a door that preferably opens outwardly and at least one ferrule that holds the optical fiber, where the ferrule is provided with an alignment pin. The biasing member includes a first biasing member, a second biasing member and a third biasing member. The first biasing member is capable of being biased to cause the alignment pin of the ferrule to open the door of the retractable shroud. The second biasing member is capable of being biased to cause the retractable shroud to be received by the body. And the third biasing member is capable of being biased to cause the retractable shroud and the body to accommodate variable wipe length.

19 Claims, 10 Drawing Sheets

WAFERIZED FIBER OPTIC CONNECTOR

CROSS-REFERENCE TO RELATED APPLICATION

This application claims priority of earlier filed U.S. Provisional Application Serial No. 60/316,594, filed Aug. 31, 2001, entitled, "Connector Design Accommodating Variable Wipe Length While Minimizing Potential Optical Fiber Misalignment".

BACKGROUND OF THE INVENTION

Traditional high speed computer and communications systems are often built using a backplane assembly. Such systems are built on several printed circuit boards ("PCB"), called "daughter boards" or "daughter cards", that are interconnected through a backplane.

A traditional backplane is a printed circuit board that has many signal traces running through it. The traces route signals between electrical connectors mounted on a surface of the backplane. The daughter cards have mating electrical connectors along one edge, allowing each daughter card to be plugged into the backplane. In this configuration, the daughter cards are parallel to each other and mounted typically at right angles to the backplane.

As the need for bandwidth in our technological society has increased, it is evident that existing communications systems will not have the capacity to provide the desired bandwidth. Thus, high-speed systems must be developed which use light to transmit data signals, in addition to the existing electrical communication architecture. Data can then be transmitted at very high rates (e.g., 10 gigabits per second). Instead of metal traces, such systems use optical fiber or waveguides to transmit the light.

It should be realized that optical communications is not like electronic communications. Light is an electromagnetic radiation having unique characteristics that are different from the characteristics of electrons. Therefore, designing a backplane assembly for light transmission has different considerations from designing a backplane assembly for electronic transmission.

A backplane assembly designed for light transmission generally includes connectors that have a ferrule holding a single optical fiber or a multi-fiber optical ribbon. The ferrule on the daughter card connector is mated with a corresponding ferrule on the backplane connector so that the optical fibers held in the mating ferrules are aligned to minimize loss. These ferrules are conventionally placed in the mating position by alignment pins and passages for receiving the alignment pins.

Due to the size of the optical fibers utilized, for example 125 micron ($10^{-6}$ meter) diameter with a 62.5 micron diameter core, it is critical to maintain precise tolerances with the alignment pins and the receiving passages. Failure to maintain precise tolerances and any other misalignment/defect could lead to significant loss of data signals at the fiber-to-fiber interface.

As more and more backplane assemblies incorporate both electrical connectors and fiber optic connectors, the above alignment/tolerance problems are further complicated by the need for the backplane assembly to accommodate variable wipe length. As used herein, "wipe length" refers to the distance required for the electrical connectors on the daughter card and backplane to establish electrical engagement. Typically, the electrical connectors are mounted on the edge of the daughter card often near the optical connectors.

This "wipe" is required primarily to counteract accumulated tolerances within the backplane/daughter card enclosure. Factors such as PCB uniformity, planarity, positional tolerancing, PCB lock location, component tolerancing and connector binding, all play roles in the final position of the electrical connectors in relation to the PCBs. These same factors can be detrimental to fiber optic connectors.

Fiber optic connectors function as butt-coupled devices. The end faces holding the optical fibers must remain in physical contact at all times to ensure that the optical signals traveling in the optical fibers are stable and uninterrupted. Therefore, fiber optic connectors must be designed to establish full engagement and provide "float" (movability in the axis of engagement) to accommodate the variable wipe of the electrical connectors. There are two main reasons for this.

First, mating forces in excess of 150 lbs. can be generated when joining high-density electrical connectors. Manual cam latch mechanisms are conventionally used to join the individual daughter cards to the backplane. These mechanisms, although manually operated, do not provide much user feedback other than a go or no-go type situation. With this being the case, if any connector is not properly aligned under such loads, then there is a strong likelihood of problems for the connection system. Therefore, it is critical that individual connectors are aligned before the latches are engaged. Furthermore, it is desirable to isolate mating force spikes by staggering the mating sequence from optical to electrical. This will provide for smoother cam latch activation when attempting to seat the daughter card on the backplane. Also, any additional loads that could bring the latches beyond their elastic limit are removed.

Second, in order to accommodate different electrical connectors and to have a product that is easily leveraged into new technologies, it is important to maximize the float to ensure compatibility and limit the possibility of conjoined future force spikes. For these characteristics to be provided, reasonably large Z-axis travel (here, the Z-axis has been selected as the axis of engagement), for example on the order of 3 to 7 millimeters, is desired. This requires that the fiber optic connectors and the electrical connectors move in relation to one another; otherwise, components would be damaged or destroyed under the force of lever arms for engaging daughter cards to the backplane.

To achieve the desired float, a slidable mechanism is typically employed within the system. For example, a prior art system disclosed in U.S. Pat. No. 5,121,454 issued to Iwano et al. utilizes side latches incorporated into the connector housing for mating, and the configuration of the latches and the connector housing provide float in the Z-direction. The latching approach of the prior art '454 patent is described in more detail with respect to FIG. 1 in the Detailed Description section.

The inventors of the present invention have recognized that while prior art fiber optic connection systems function adequately for the most part, there are disadvantages that have not been addressed by the prior art systems. First, the prior art systems known to the inventors do not provide design flexibility. For example, as the number of optical fibers or other requirements in a connector changes, there is a need to retool and redefine the design to satisfy such requirements. And this retooling/redefinition process is costly and time consuming. Referring back to the fiber optic connector disclosed in the prior art '454 patent, it is apparent to one of ordinary skill in the art that should the connector requirements change (e.g., requiring more optical fibers to be held by the connector), the connector design will have to be redefined and substantial retooling will be necessary.

Second, because of the substantial mating forces present, the prior art systems employ complex latch/release mechanisms which tend to increase the size and material cost of the connection system. More importantly, perhaps, this increased size of the connection system uses up valuable space on the printed circuit board—which space could have been utilized by other components.

What is desired, therefore, is a fiber optic connector that accommodates variable wipe length of electrical connectors while addressing the disadvantages of prior art systems by providing for design flexibility in a cost-effective, time saving manner.

SUMMARY OF THE INVENTION

It is therefore an object of this invention to provide a fiber optic connector design that accommodates variable wipe length while minimizing loss of data signals at the fiber-to-fiber interface.

Another object of the invention is to provide a fiber optic connector design that permits modularity for flexible configurations to meet various system configurations and/or density requirements.

Still another object of the invention is to provide a fiber optic connector design that improves cost, process control and manufacturing lead time.

Yet another object of the invention is to provide a fiber optic connector design that improves cleanliness and component protection while also providing eye safety.

These and other objects of the invention are achieved, generally, by a fiber optic connector having at least one wafer, wherein the wafer holds at least one optical fiber. The wafer includes a retractable shroud, a body to receive the retractable shroud, and at least one biasing member. The biasing member is capable of being biased when the wafer contacts a corresponding mating wafer to cause the shroud to retract.

In one detailed perspective and embodiment of the invention, the wafer as stated further includes the retractable shroud having a door that preferably opens outwardly and at least one ferrule that holds the optical fiber, where the ferrule is provided with an alignment pin. The biasing member includes a first biasing member, a second biasing member and a third biasing member. The first biasing member is capable of being biased to cause the alignment pin of the ferrule to open the door of the retractable shroud. The second biasing member is capable of being biased to cause the retractable shroud to be received by the body. And the third biasing member is capable of being biased to cause the retractable shroud and the body to accommodate variable wipe length.

DETAILED DESCRIPTION OF THE PREFERRED EMBODIMENT

Figure 1:
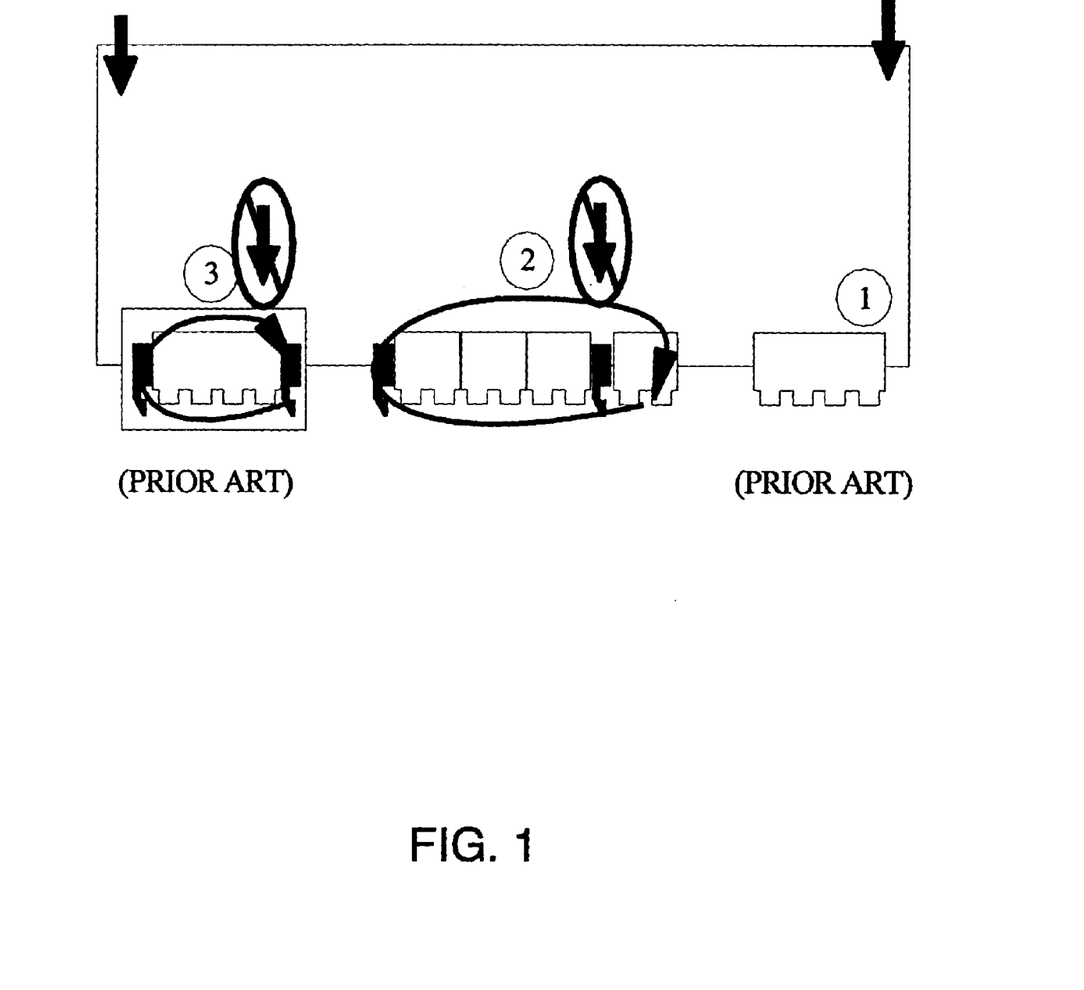
FIG. 1 is a schematic illustration of three different configurations for a fiber optic connection system, where options 1 and 3 depict prior art configurations and option 2 generally depicts the configuration of the present invention.

FIG. 1 illustrates three different configurations for a fiber optic connection system. Options 1 and 3 are configurations of the prior art, while option 2 is the configuration of the present invention. FIG. 1 shows the forces that exist due to the latching configuration utilized. The loops represent the circle of force and how it is distributed in the system, while the bold arrow identifies whether or not a forward force will be applied to the backplane after mating. Note that only in the configuration of option 1, is there a forward force applied to the backplane after mating. Latches are solidly colored for easier identification.

Option 1 shows a prior art daughter card fiber optic connector that is rigidly held to the backplane by external cam latches or card screw mounted in the enclosure. This configuration is utilized, for example, by 3M's OGI backplane connector. In this configuration, the force is distributed throughout the daughter card and is putting pressure on the retention means (e.g., latch or screws) in an attempt to force the daughter card back out of the system. Float in the axis of engagement is provided by springs loaded to an adapter (not shown) attached to the connector. This option is viable when the daughter card is relatively small. However, option 1 has disadvantages that make this option undesirable in many circumstances. For example, when the daughter card is no longer small, forces distributed over such distance would be difficult to control and predict. Also, when many ferrules are required for each connector, the force required increases and is multiplied by the number of daughter cards. Further, this configuration does not lend itself to a wide variety of system configurations.

Option 3 shows a prior art daughter card fiber optic connector in which the forces are removed from the backplane once the system is fully engaged. This configuration is desirable from the standpoint that because the force on the backplane has been removed, there is eliminated the potential for fatigue in the system or stresses which may damage electrical components. In this latching configuration, the side latches, typically made of plastic, retain the two assembly halves together, and allow the connector on either the daughter card or the backplane to float in the Z-direction (axis of engagement). The inventors of the present invention believe that U.S. Pat. No. 5,121,454 issued to Iwano et al. and Diamond GmbH's E-2000™ connector, for example, utilize this form of latching.

As described above in the Background section, the fiber optic connector of option 3 is undesirable from the standpoint that it lacks design flexibility and uses up valuable space on a printed circuit board.

The fiber optic connector configuration shown in option 2, which is the preferred embodiment of the present invention, utilizes separable wafer modules. In addition, the configuration of option 2 preferably utilizes separable latching modules. This approach provides an opportunity for stackable components, which act as modular building blocks. Also, modular latching provides an ability to distribute forces within a system as desired. By simply adding another latching module into the connector assembly, loads can be distributed over a greater surface area and thus, minimize the force on any given latching module. Further, metallic materials may be used if desired to encapsulate the connector, thereby improving the overall system's shielding and durability. And by employing separable wafer modules, custom designs can be configured without specialty tooling and assembly equipment, thereby providing a vehicle for fast, cost-effective manufacturing cycles and scalability. It should be noted that the position of the latching modules shown in option 2 is solely for illustrative purposes and is in no way intended to limit the scope of the present invention to the configuration shown therein.

Figure 2:
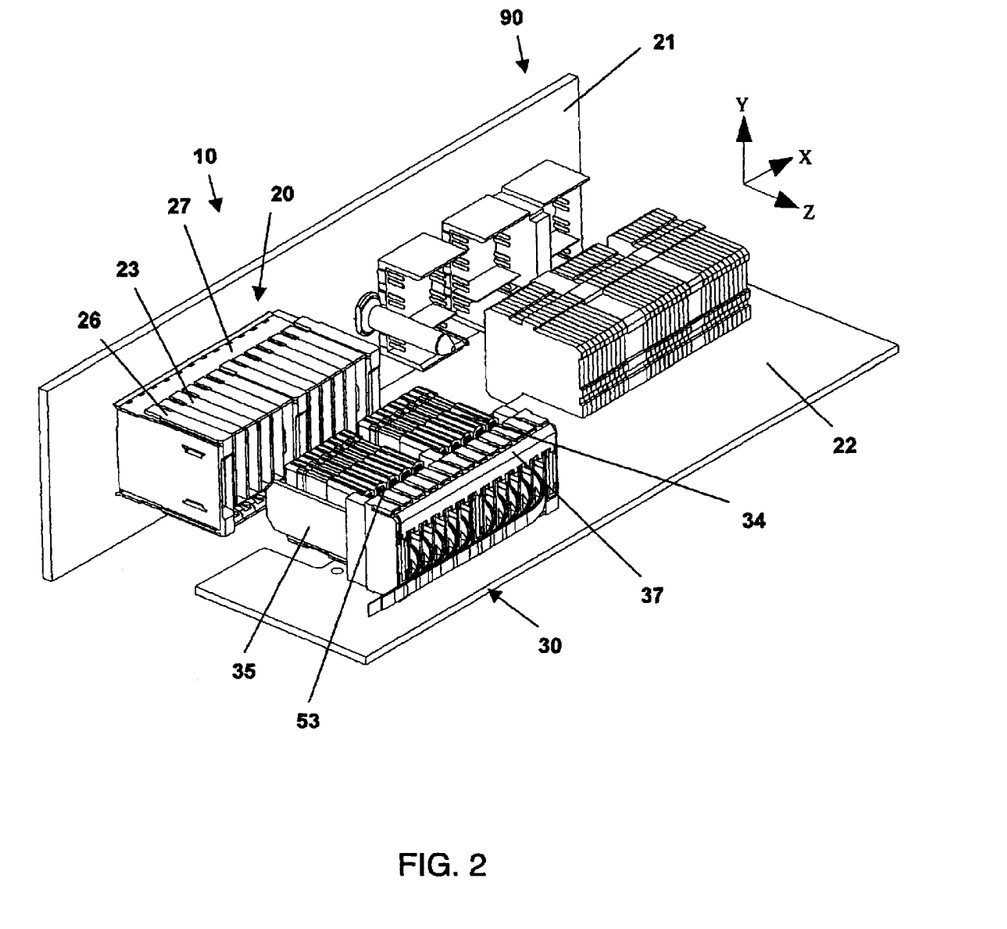
FIG. 2 is a perspective view showing an embodiment of a fiber optic connector assembly (in an unmated position) of option 2 of FIG. 1, along with an electrical connector assembly (in an unmated position)
Figure 3:
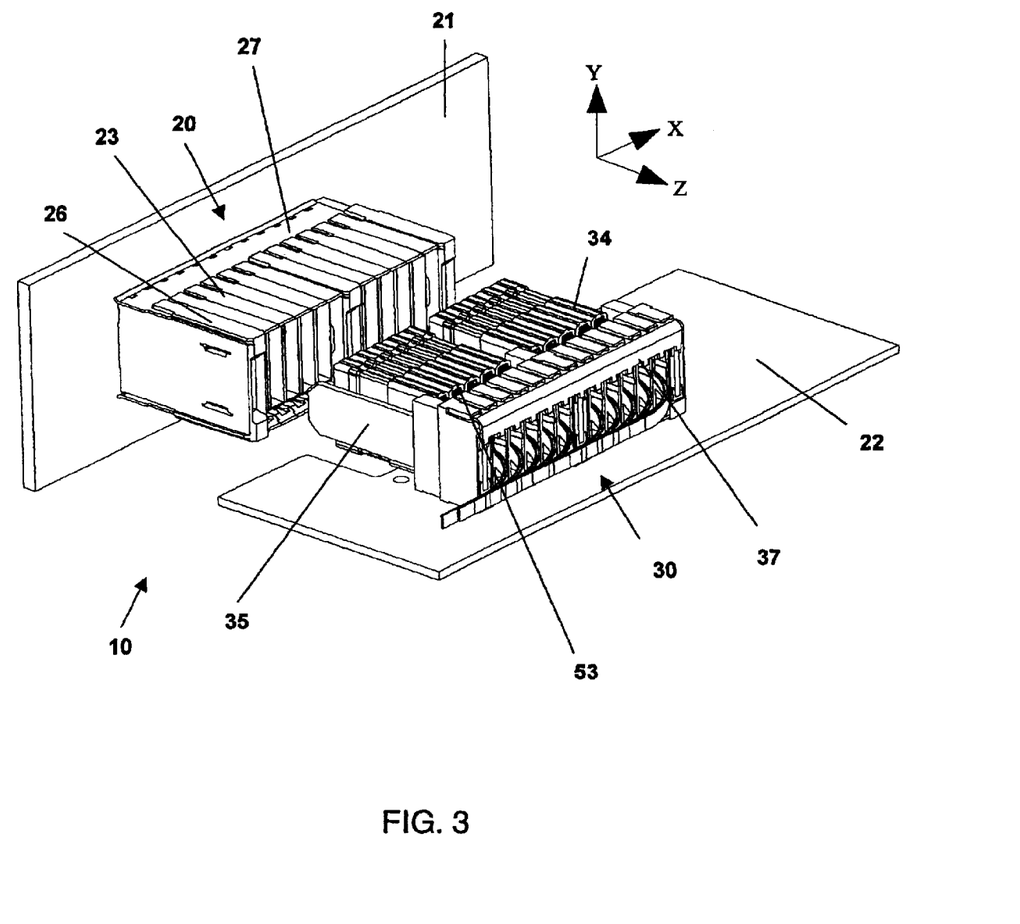
FIG. 3 is a perspective view showing only the fiber optic connector assembly of FIG. 2.

FIG. 2 is a perspective view showing an embodiment of a fiber optic connector assembly configuration (in an unmated position) of option 2 of FIG. 1, generally shown by reference numeral 10, along with an electrical connector assembly (in an unmated position), generally shown by reference numeral 90. Fiber optic connectors of the fiber optic connector assembly 10 and electrical connectors of the electrical connector assembly 90 are attached to first and second printed circuit boards ("PCB") 21 and 22. FIG. 3 is a perspective view showing only the fiber optic connector assembly 10 of FIG. 2. As will become apparent to one of ordinary skill in the art from the discussion below, the objects of the present invention may be achieved with one, two or more fiber optic connectors attached to each PCB 21, 22.

As shown in FIGS. 2 and 3, the fiber optic connector assembly 10 includes the fiber optic connector 20 for the first PCB 21, e.g., backplane, and the mating fiber optic connector 30 for the second PCB 22, e.g., a daughter card. The fiber optic connector 20 includes a plurality of wafers 23, latching modules 26, and a module carrier 27, preferably a stiffening member, which holds the wafers 23 and the latching modules 26. The fiber optic connector 30 includes a plurality of wafers 34, latching modules 35, and a module carrier 37, preferably a stiffening member, which holds the wafers 34 and the latching modules 35. While the latching modules 26 are shown with fiber optic connector 20 and the latching modules 35 shown with fiber optic connector 30, it should be apparent to one of ordinary skill in the art that the location of the modules 26, 35 may be exchanged without deviating from the function or objectives of the present invention.

The design of the fiber optic connectors 20, 30 allows for modularity because the wafers are similarly sized. This means that accommodating different system configurations or density requirements can be achieved by selecting a suitable stiffening member and number of wafers as desired. Note that the latching modules 26, 35 are also modular, so the number of such modules incorporated and the location of such modules on the fiber optic connectors can be varied.

Figure 4:
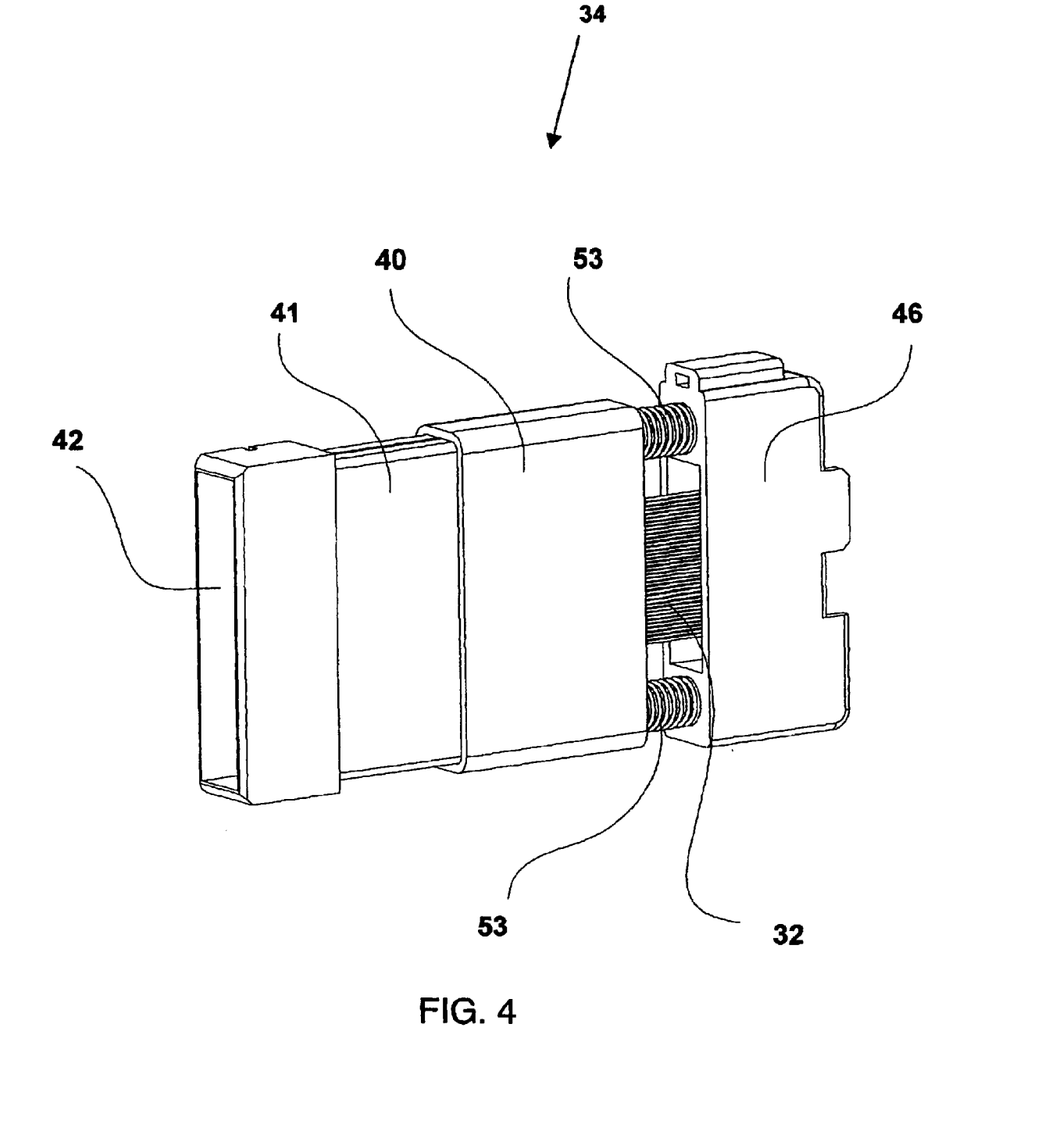
FIG. 4 shows one of the plurality of wafers (outwardly opening door of the shroud in a closed position) of a fiber optic connector of FIGS. 2 and 3.
Figure 5:
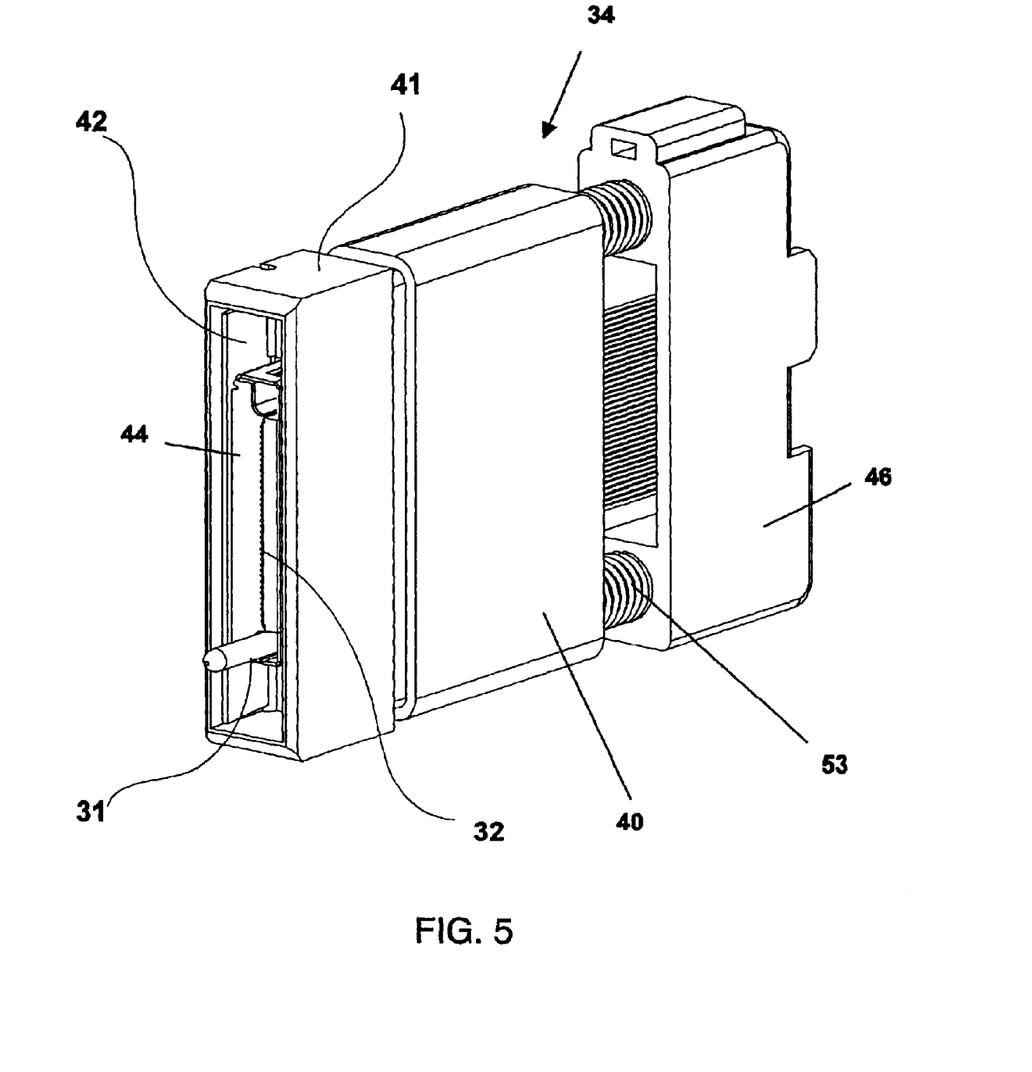
FIG. 5 shows the wafer of FIG. 4 with the outwardly opening door of the shroud in an open position.

FIGS. 4 and 5 show one of the plurality of wafers 34 of the fiber optic connector 30 of FIGS. 2 and 3. The wafer 34 includes a support frame 46, a body 40 and a retractable shroud 41. The support frame 46 is configured to be attachable to the stiffening member 37. The retractable shroud 41 has a door 42 that preferably opens outwardly. In FIG. 4, the door 42 is shown in the closed position and in FIG. 5, the door 42 is shown in the opened position. At least one ferrule 44 (shown in FIG. 5) for holding one or more optical fibers 32 is housed in the retractable shroud 41/body 40 of the wafer 34. The ferrule 44 may be one of the commercially available ferrules, such as, for example, the MT ("Mechanical Transfer") ferrule developed by Nippon Telegraph and Telephone Corporation or the MAC ("Multifiber Array Connector") ferrule developed by AT&T, or the ferrule disclosed in the concurrently filed non-provisional patent application entitled "Optical Connector Ferrule Designed To Minimize Manufacturing Imperfections And Mating Misalignments By Incorporating Exact Constraint Principles" (which is incorporated by reference herein), or any other ferrules that can be incorporated into the wafer design as described herein. The ferrule 44 shown in FIG. 5 is a multi-fiber ferrule, but it should be apparent to one of ordinary skill in the art that the wafer design of the present invention can be utilized for a single-fiber ferrule, as well as any number of multiple-fiber or single-fiber ferrules.

The wafer 34 further includes an alignment pin 31 used to guide and align during mating of the ferrule 44 to a corresponding ferrule of wafer 23 of the fiber optic connector 20. In addition, the alignment pin 31 is used to open the door 42, thus protecting the ferrule from possible damage or wear while preventing the optical end face of the ferrule from coming into contact with possible debris or contaminants. And because the door 42 opens outwardly in the preferred embodiment, the door moves dirt, dust and other undesirable debris and contaminants away from the ferrule, where such debris and contaminants may interfere with transmission of optical data. Another advantage of the retractable shroud 41 design as shown in FIGS. 4 and 5 is that the door 42 does not open to expose the optical fibers 32 until wafers 34, 23 are mating. This is described in greater detail below. Therefore, this design ensures eye safety. It should be noted that while the embodiment described utilizes the alignment pin 31 to push open the door 42, it will be apparent to one of ordinary skill in the art that other ways to open the door 42 may be utilized without departing from the function or objectives of the present invention. For example, the door may be opened by an actuable member on the outside of the shroud which is actuated when contacted by the shroud of the opposing wafer. Further, while the preferred embodiment is a retractable shroud with an externally opening door, the present invention can also function with an internally opening door.

A pair of spring members 53 are shown between the body 40 and the support frame 46. The wafer 34 also has two other pairs of spring members 51, 52, which are shown in FIGS. 6a–6e. The operation of these spring members and the operation of the different components of the wafer 34 during mating of the wafer 34 to a corresponding wafer 23 are described with respect to FIGS. 6a–6e.

Figure 6A:
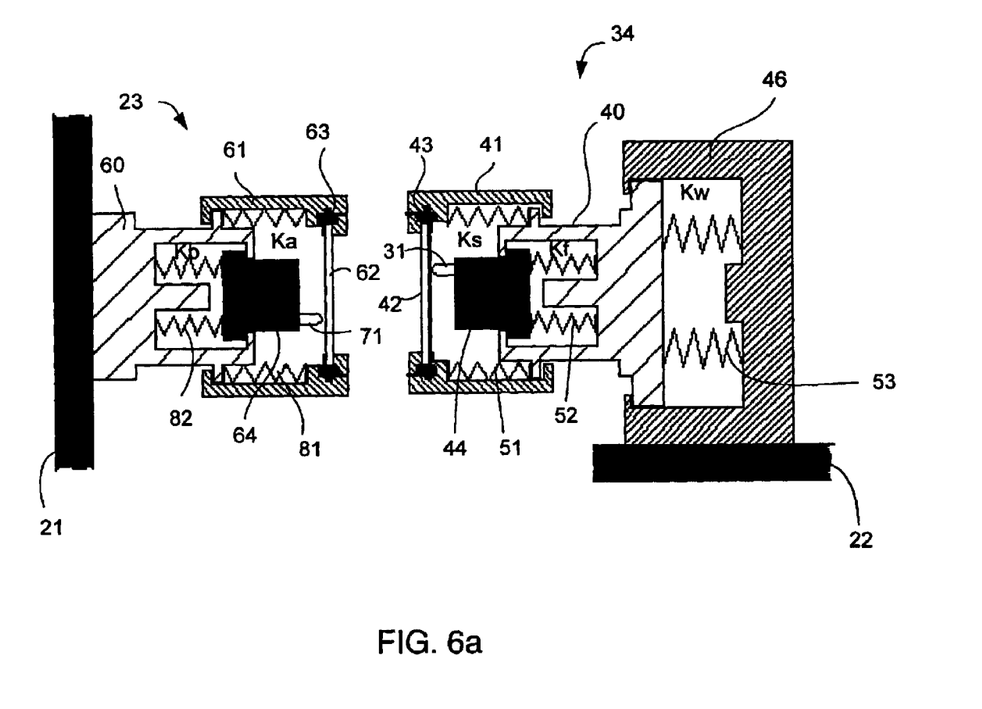
FIGS. 6a–6e are not-to-scale drawings of the wafers of the fiber optic connector assembly of FIGS. 2 and 3, intended only to illustrate the operation of the wafers during different stages of the mating process.

FIGS. 6a–6e are not-to-scale drawings of the wafers 23, 34, intended only to illustrate the operation of the wafers 23, 34 during different stages of the mating process. FIG. 6a shows the wafers 23, 34 before the mating process has begun. Wafer 23 includes a body 60 and a retractable shroud 61. The body 60 is configured to be attachable to the stiffening member 27 (shown in FIGS. 2 and 3). The retractable shroud has a door 62 that opens outwardly. A ferrule 64 for holding one or more optical fibers (not shown) is housed in the retractable shroud 61/body 60 of the wafer 23. As discussed above with respect to ferrule 44 of wafer 34, the ferrule 64 may be one of the commercially available ferrules, such as the MT-type or the MAC-type ferrule, or the ferrule disclosed in the concurrently filed non-provisional patent application entitled "Optical Connector Ferrule Designed To Minimize Manufacturing Imperfections And Mating Misalignments By Incorporating Exact Constraint Principles", or any other ferrules that can be incorporated into the wafer design as described herein.

The wafer 23 further includes an alignment pin 71 used to guide and align during mating of the ferrule 64 to the corresponding ferrule 44 of wafer 34 of the fiber optic connector 30. In addition, the alignment pin 71 is used to push open the door 62, thus protecting the ferrule from possible damage or wear while preventing the optical end face of the ferrule from coming into contact with possible debris or contaminants. And because the door 62 opens outwardly, the door moves dirt, dust and other undesirable debris and contaminants away from the ferrule, where such debris and contaminants may interfere with transmission of optical data. Another advantage of the retractable shroud 61 design is that the door 62 does not open to expose the optical fibers until wafers 23, 34 are mating. Therefore, this design ensures eye safety. As shown, the wafer 23 also includes two pairs of spring members 81, 82. It should be noted that while the embodiment described utilizes the alignment pin 71 to push open the door 62, it will be apparent to one of ordinary skill in the art that other ways to push open the door 62 may be utilized without departing from the function or objectives of the present invention. For example, the door may be opened by an actuable member on the outside of the shroud which is actuated when contacted by the shroud of the opposing wafer.

FIG. 6a shows the wafers 23, 34 before the mating process has begun. All of the pairs of spring members 51, 52, 53 of wafer 34 and the pairs of spring members 81, 82 of wafer 23 are in a preloaded state. For wafer 34, the spring members 51 provide a spring rate $K_s$, the spring members 52 provide a spring rate $K_f$ and the spring members 53 provide a spring rate $K_w$. For wafer 23, the spring members 81 provide a spring rate $K_a$ and the spring members 82 provide a spring rate $K_b$.

In the preferred embodiment, the spring rates and preloads of springs 51 and 81 are identical, and the spring rates and preloads of springs 52 and 82 are identical. Thus, the operation of the springs 81, 82 in wafer 23 will mirror the operation of the springs 51, 52 in wafer 34. In FIGS. 6a–6e, the spring members 51, 52, 53, 81, 82 are shown as pairs of coiled springs. However, it should be apparent to one of ordinary skill in the art that anything that is capable of providing a biasing force (e.g., magnets, elastic materials) may be used, and that there could be any number of biasing members used as long as they function in the manner described herein to provide Z-axis float. Note that for ease of description, the spring rates will be treated as one value for each pair of springs. The sequence of operation will now be described with reference to FIGS. 6b–6f.

Figure 6B:
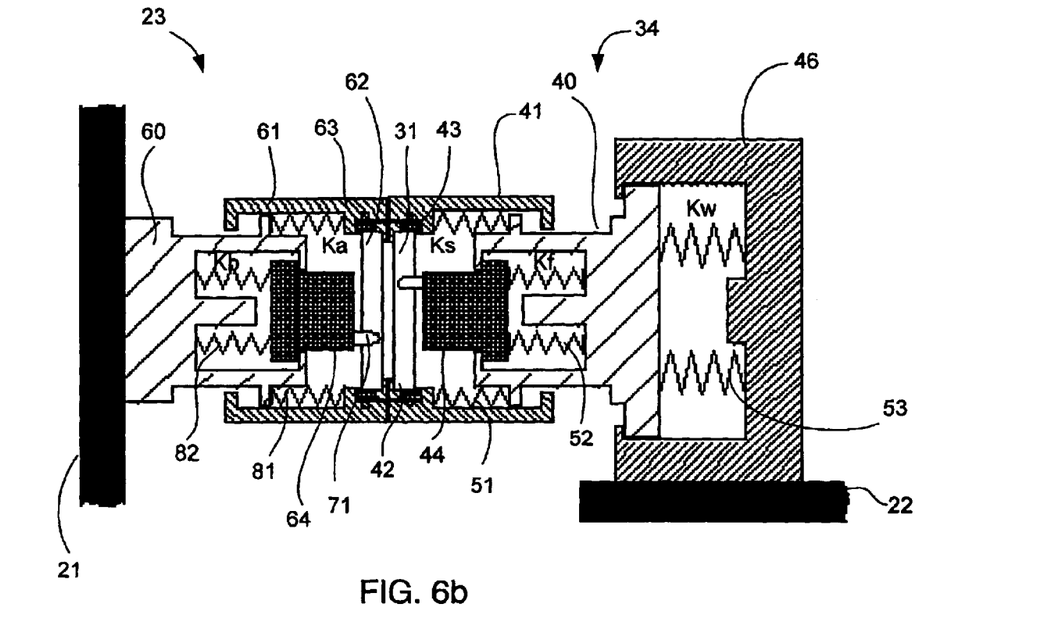
Figure 6C:
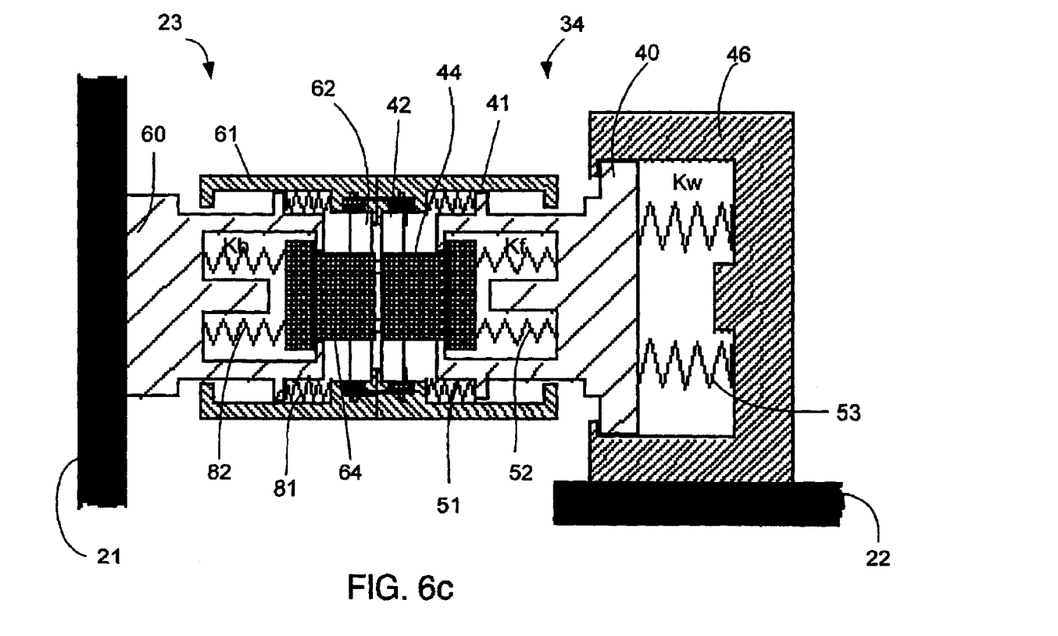
Figure 6D:
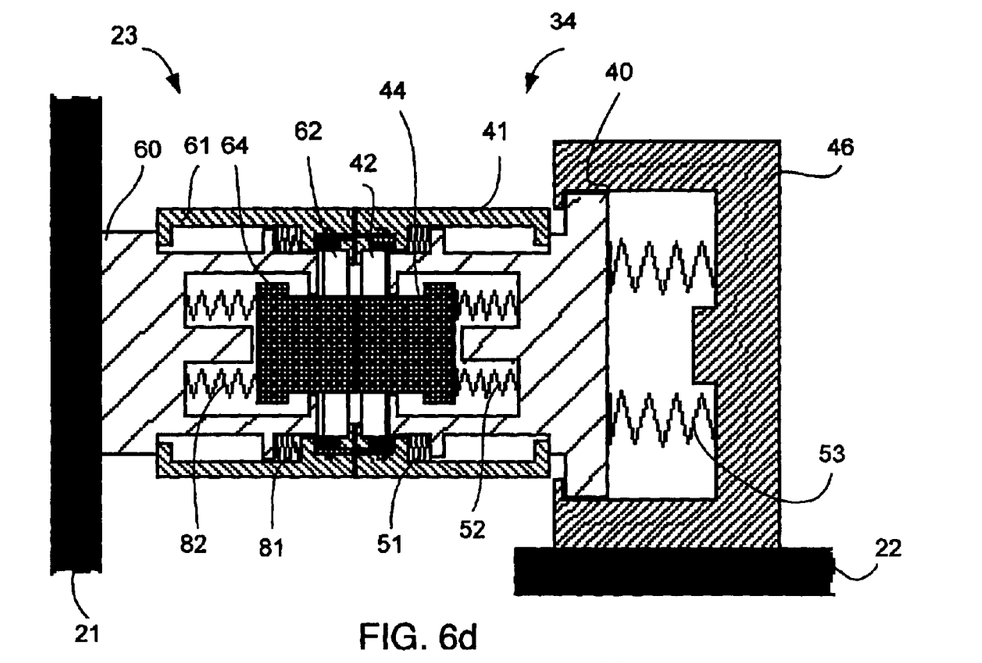
Figure 6E:
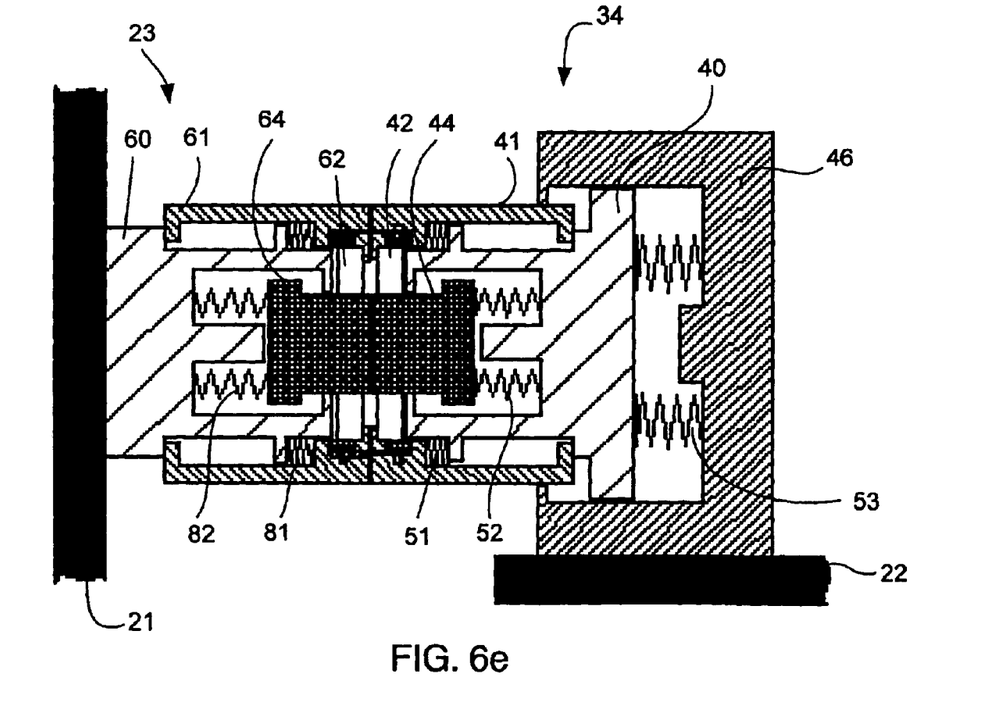
Figure 6F:
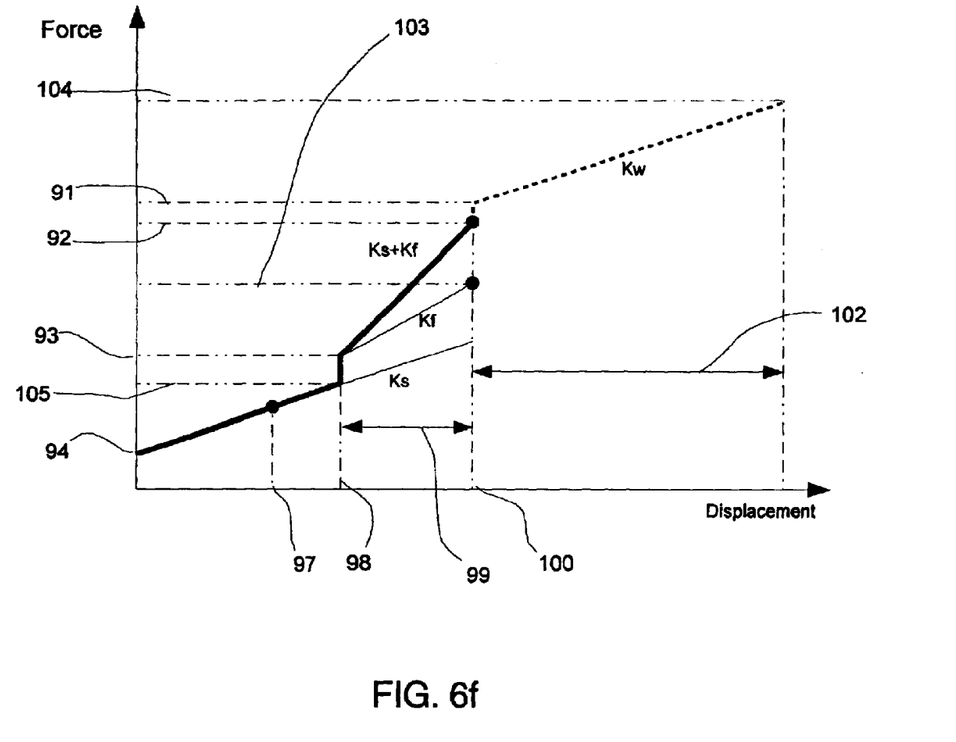
FIG. 6f is an illustrative diagram showing force and displacement of components of wafers during the mating stages of FIGS. 6a–6e.

FIG. 6b shows the wafers 23, 34 at the moment of contact. As the shrouds 41, 61 make contact, the springs 51, 81 begin to compress as the preload force is overcome. FIG. 6f, which is a diagram illustrating force of the springs of wafers 23, 34 and displacement of components of wafers 23, 34 during mating, shows the preload force of springs 51, 81 by reference numeral 94. At the moment of contact of the shrouds 41, 61, the doors 42, 62 are in a closed position protecting the ferrules 44, 64 from debris and other contaminants. Note that torsion springs 43, 63 generally bias the doors 42, 62, respectively, to a closed position; thus, forming a sealed chamber protected from debris and other contaminants. As the springs 51, 81 compress, the doors 42, 62 are pushed open by alignment pins 31, 71, respectively. The displacement of the shrouds 41, 61 where the alignment pins 31, 71 cause the doors 42, 62 to be opened is shown in FIG. 6f by reference numeral 97. While the preferred embodiment of the invention shows the doors 42, 62 generally rotating about hinge pivots, it should be apparent to one of ordinary skill in the art that others manners for opening and closing the doors can be utilized.

As the wafers 23, 34 continue through the mating process, the increasing force applied thereon causes the ferrules 44, 64 to come into contact. This is shown in FIG. 6c. The displacement of the shrouds 41, 61 where the ferrules 44, 64 come into contact is shown in FIG. 6f by reference numeral 98, and the force required is indicated by reference numeral 105. The preload force of springs 52, 82 is indicated by reference numeral 93. As the preload force 93 of springs 52, 82 is overcome, the springs 52, 82 begin to compress and the ferrules 44, 64 and the shrouds 41, 61 move in parallel at the combined spring rate $K_s+K_f$ and $K_a+K_b$, respectively. In the preferred embodiment, the fiber optic connection system is configured so that the shrouds 41, 61 bottom out against the bodies 40, 60, respectively, as shown in FIG. 6d. At this point, the shroud displacement is indicated by reference numeral 100 (see FIG. 6f), the ferrule displacement is indicated by reference numeral 99, the force required to reach this point is indicated by reference numeral 92, and the butt-couple force between the mated ferrules 44, 64 is indicated by reference numeral 103. Because the ferrules 44, 64 cannot be displaced any more, the force on the ferrules is held constant at the required butt-couple force for the remainder of the operations.

At the point of maximum ferrule displacement, additional increasing force applied to the wafers 23, 34 causes the springs 53 of the wafer 34 to begin compressing as the preload force of the springs 53, which is indicated by reference numeral 91 in FIG. 6f, is overcome. This is shown in FIG. 6e. It is this compression of the springs 53 which provides float in the Z-axis (the axis of engagement) for the fiber optic connection system of the present invention. The Z-float range is indicated by reference numeral 102. Note that the position in the Z-float range 102 where the system is seated (i.e., no further displacement of the connectors) is determined by the electrical connectors. The maximum force required by the system at maximum Z-float displacement is indicated by reference numeral 104.

By using a multi-stage spring design, the fiber optic connector design of the present invention accommodates variable wipe length of the electrical connectors, while minimizing potential optical fiber misalignment, and isolates the inner ferrule forces from the outer assembly. In addition, by selecting the spring members accordingly, the movement of the fiber optic connector can be sequenced to ensure that the appropriate spring members are traveling when desired without the need for isolating faces or positive stops.

Figure 7:
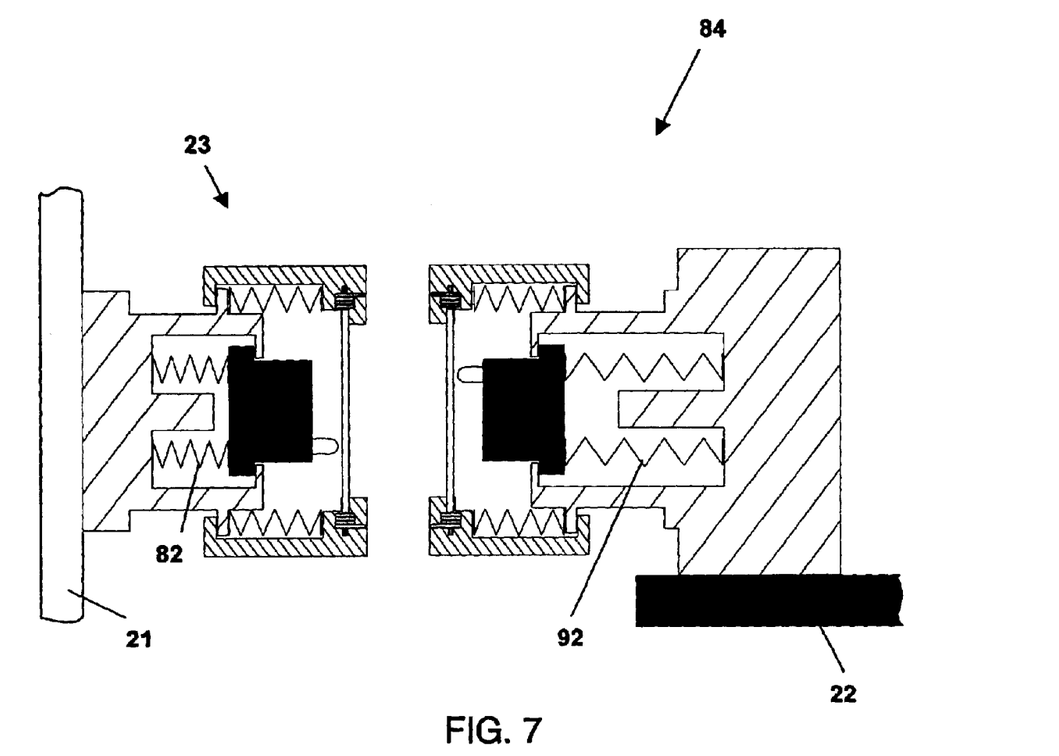
FIG. 7 is a not-to-scale drawing of the wafers of an alternate embodiment of the fiber optic connector assembly of the present invention.

FIG. 7 is a not-to-scale drawing of the wafers of an alternate embodiment of the fiber optic connector assembly of the present invention. In this figure, which is similar in presentation to FIG. 6a, the wafer 23 of the fiber optic connector 20 attached to the first PCB 21 is the same as in FIG. 6a. However, the wafer 84 of the fiber optic connector attached to the second PCB 22 is different from the wafer 34 in FIG. 6a. Importantly, this wafer 84 does not have the pair of spring members 53 found in wafer 34. Note that this wafer 84 is generally similar to the wafer 23 in configuration and operation; however, spring members 92 are longer than the spring members 82 of wafer 23 to provide float in the axis of engagement. While the fiber optic connector assembly shown in FIG. 7 may be suitable in certain cases, it will in other instances be inappropriate because of its limited ability to accommodate wide-ranging variable wipe length.

Having described the preferred embodiment of the invention in sufficient detail to enable those skilled in the art to make and use the invention, it will nevertheless be appreciated that variations and modifications to the described preferred embodiment may be made without departing from the spirit and scope of the invention, and it is intended that the invention not be limited to the above description or accompanying drawings, but that it be defined in accordance with the following claims. For example, while the preferred embodiment of the invention uses a retractable shroud wafer structure to accommodate variable wipe, it would not be a departure from the scope of the invention to provide a wafer without a retractable shroud to accommodate variable wipe.

What is claimed is:

1. A fiber optic connector having at least one wafer, wherein the at least one wafer is capable of accommodating variable wipe length and comprises:
    a retractable shroud having a door;
    a body to receive the retractable shroud;
    at least one ferrule that holds at least one optical fiber, the ferrule being provided with an alignment pin;
    a first biasing member, a second biasing member, and a third biasing member;
    the first biasing member capable of being biased to cause the alignment pin of the at least one ferrule to open the door of the retractable shroud;
    the second biasing member capable of being biased to cause the retractable shroud to be received by the body; and
    the third biasing member capable of being biased to cause the retractable shroud and the body to move so as to accommodate variable wipe length.

2. The at least one wafer of the fiber optic connector of claim 1, wherein the at least one ferrule is an MT-type ferrule.

3. The at least one wafer of the fiber optic connector of claim 1, wherein the at least one ferrule is a MAC-type ferrule.

4. The at least one wafer of the fiber optic connector of claim 1, wherein the preload force provided by the third biasing member is greater than the preload force provided by the second biasing member, which is greater than the preload force provided by the first biasing member.

5. The at least one wafer of the fiber optic connector of claim 1, wherein the door is rotatably attached to the retractable shroud by hinges.

6. The fiber optic connector of claim 1, wherein each of the at least one wafer are identical.

7. A fiber optic connector, which comprises:
    a stiffening member;
    at least one wafer attached to the stiffening member, the at least one wafer comprising:
    a retractable shroud having a door;
    a body to receive the retractable shroud;
    a support frame configured to attach to the stiffening member;
    at least one ferrule that holds at least one optical fiber, the at least one ferrule being provided with an alignment pin;
    a first biasing member, a second biasing member, and a third biasing member;
    the first biasing member capable of being biased to cause the alignment pin of the at least one ferrule to open the door of the retractable shroud;
    the second biasing member capable of being biased to cause the retractable shroud to be received by the body; and
    the third biasing member capable of being biased to cause the retractable shroud and the body to move in the direction of the support frame.

8. The fiber optic connector of claim 7, wherein the preload force provided by the third biasing member is greater than the preload force provided by the second biasing member, which is greater than the preload force provided by the first biasing member.

9. The fiber optic connector of claim 7, wherein each of the at least one wafer are identical.

10. The fiber optic connector of claim 7, which further comprises at least one latching module attached to the stiffening member.

11. The fiber optic connector of claim 10, wherein the placement of the at least one latching module and the at least one wafer on the stiffening member may be changed.

12. A fiber optic connector assembly, which comprises:
    a first fiber optic connector having at least one first wafer, the at least one first wafer comprising:
    a retractable shroud having a door;
    a body to receive the retractable shroud;
    at least one ferrule that holds at least one optical fiber, at least one ferrule being provided with an alignment pin;
    biasing members, the biasing members capable of being biased to cause the door to open, the shroud to be received by the body and the first wafer to move to aid in accommodating variable wipe length; and
    a second fiber optic connector having at least one second wafer, the at least one second wafer comprising:
    a retractable shroud having a door;
    a body to receive the retractable shroud;
    at least one ferrule that holds at least one optical fiber, the at least one ferrule being provided with an alignment pin;
    biasing members, the biasing members capable of being biased to cause the door to open and the shroud to be received by the body.

13. The fiber optic connector assembly of claim 12, wherein the biasing members of the at least one first wafer comprises a first, second and third set of springs, where each of the first, second and third set of springs provides a different preload force.

14. The fiber optic connector assembly of claim 13, wherein for the at least one first wafer, the preload force provided by the third set of springs is greater than the preload force provided by the second set of springs, which is greater than the preload force provided by the first set of springs.

15. The fiber optic connector assembly of claim 12, wherein each of the at least one first wafer of the first fiber optic connector are identical.

16. The fiber optic connector assembly of claim 12, wherein each of the at least one first wafer of the first fiber optic connector are identical and each of the at least one second wafer of the second fiber optic connector are identical.

17. The fiber optic connector assembly of claim 12, wherein the first fiber optic connector further comprises a first stiffening member to which the at least one first wafer is attached and the second fiber optic connector further comprises a second stiffening member to which the at least one second wafer is attached.

18. The fiber optic connector assembly of claim 12, wherein the first fiber optic connector further comprises at least one latching module and the second fiber optic connector further comprises at least one reception module to receive the at least one latching module.

19. A method of a fiber optic connector having a plurality of wafers that accommodates variable wipe length, which comprises:

providing, for each of the plurality of wafers, a retractable shroud;
providing a door for the retractable shroud;
providing a body to receive the retractable shroud;
providing at least one optical fiber for each of the plurality of wafers;
providing a plurality of biasing members;
opening the door during mating of the fiber optic connector to a corresponding fiber optic connector, by biasing one or more of the biasing members;
causing the retractable shroud to be received by the body, during mating of the fiber optic connector to the corresponding fiber optic connector, by biasing one or more of the biasing members; and
accommodating variable wipe length, during mating of the fiber optic connector to the corresponding fiber optic connector, by biasing one or more of the biasing members.

* * * * *